(12) United States Patent
Vogman

(10) Patent No.: US 7,064,530 B2
(45) Date of Patent: Jun. 20, 2006

(54) VOLTAGE REGULATOR CURRENT SENSING

(75) Inventor: Viktor D. Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 10/813,378

(22) Filed: Mar. 30, 2004

(65) Prior Publication Data
US 2005/0219865 A1 Oct. 6, 2005

(51) Int. Cl.
G05F 1/577 (2006.01)
(52) U.S. Cl. .................. 323/267; 323/271; 323/282
(58) Field of Classification Search ............... 323/267, 323/271, 282
See application file for complete search history.

(56) References Cited

U.S. PATENT DOCUMENTS

| | | | | |
|---|---|---|---|---|
| 4,095,166 A * | 6/1978 | Shibata et al. | ............... | 323/271 |
| 5,455,501 A * | 10/1995 | Massie | ............... | 323/267 |
| 5,532,577 A * | 7/1996 | Doluca | ............... | 323/282 |
| 5,552,695 A * | 9/1996 | Schwartz | ............... | 323/271 |
| 5,808,455 A * | 9/1998 | Schwartz et al. | ............... | 323/271 |
| 5,936,387 A * | 8/1999 | Tabata et al. | ............... | 323/225 |
| 6,479,972 B1 * | 11/2002 | Chen | ............... | 323/266 |
| 6,600,298 B1 * | 7/2003 | McDonald et al. | ............... | 323/225 |
| 6,707,281 B1 * | 3/2004 | Solivan | ............... | 323/225 |
| 6,756,772 B1 * | 6/2004 | McGinnis | ............... | 323/225 |
| 6,765,371 B1 * | 7/2004 | Kataoka | ............... | 323/222 |
| 6,815,939 B1 * | 11/2004 | Umemoto et al. | ............... | 323/286 |
| 6,865,682 B1 * | 3/2005 | Talbot et al. | ............... | 713/300 |
| 6,930,474 B1 * | 8/2005 | Wang | ............... | 323/288 |
| 6,995,483 B1 * | 2/2006 | Kohout et al. | ............... | 307/151 |
| 7,006,362 B1 * | 2/2006 | Mizoguchi et al. | ............... | 363/16 |

OTHER PUBLICATIONS

"TPS5210 Programmable Synchronous-Buck Regulator Controller", SLVS171A—Sep. 1998, Revised May 1999, Copyright © 1999, Texas Instruments Incorporated, 29pgs.
Varga, Craig "Topology Tradeoffs and Layout Considerations for High Current Power Supplies, Ramblings of a Power Supply Designer", Sep. 2003, National Semiconductor, The Sight & Sound of Information, 20pgs.

* cited by examiner

Primary Examiner—Jeffrey Sterrett
(74) Attorney, Agent, or Firm—Buckley, Maschoff & Talwalkar LLC

(57) ABSTRACT

A system may include a voltage regulator converter to generate a supply voltage, the voltage regulator converter comprising a high side power transistor to generate a high side alternating current and a low side power transistor to generate a low side alternating current, a current sensing circuit to generate a first alternating current based on the high side alternating current and to generate a second alternating current based on the low side alternating current, a rectifier circuit to generate a substantially direct current based on the first alternating current and on the second alternating current, and a resistive element to receive the substantially direct current, wherein a voltage drop across the resistive element is to be proportional to the supply voltage.

20 Claims, 5 Drawing Sheets

VOLTAGE REGULATOR CURRENT SENSING

BACKGROUND

A voltage regulator may convert power that is received from a power supply at first voltage and current levels to second voltage and current levels. According to some examples, the power is supplied at 12V and 20 A and is converted by the voltage regulator to 1V and 100 A. The converted voltage and current levels may be suitable for providing power to an integrated circuit (IC).

An IC may be designed to operate in conjunction with a specified range of supply voltage and current levels. Levels that fall outside this range may cause speed path problems and/or IC degradation. A voltage regulator may therefore also be used to tightly control the voltage and current levels of power supplied to an IC.

A voltage regulator may use a current sensing circuit to detect and control the voltage and current levels of power supplied thereby. Increases in the accuracy of current sensing may allow the use of voltage regulator elements that are rated for lower power use, and therefore may increase voltage regulator reliability and decrease voltage regulator cost. However, since current sensing consumes power generated by the voltage regulator, current sensing reduces the efficiency of power delivery to the IC.

DETAILED DESCRIPTION

Figure 1:
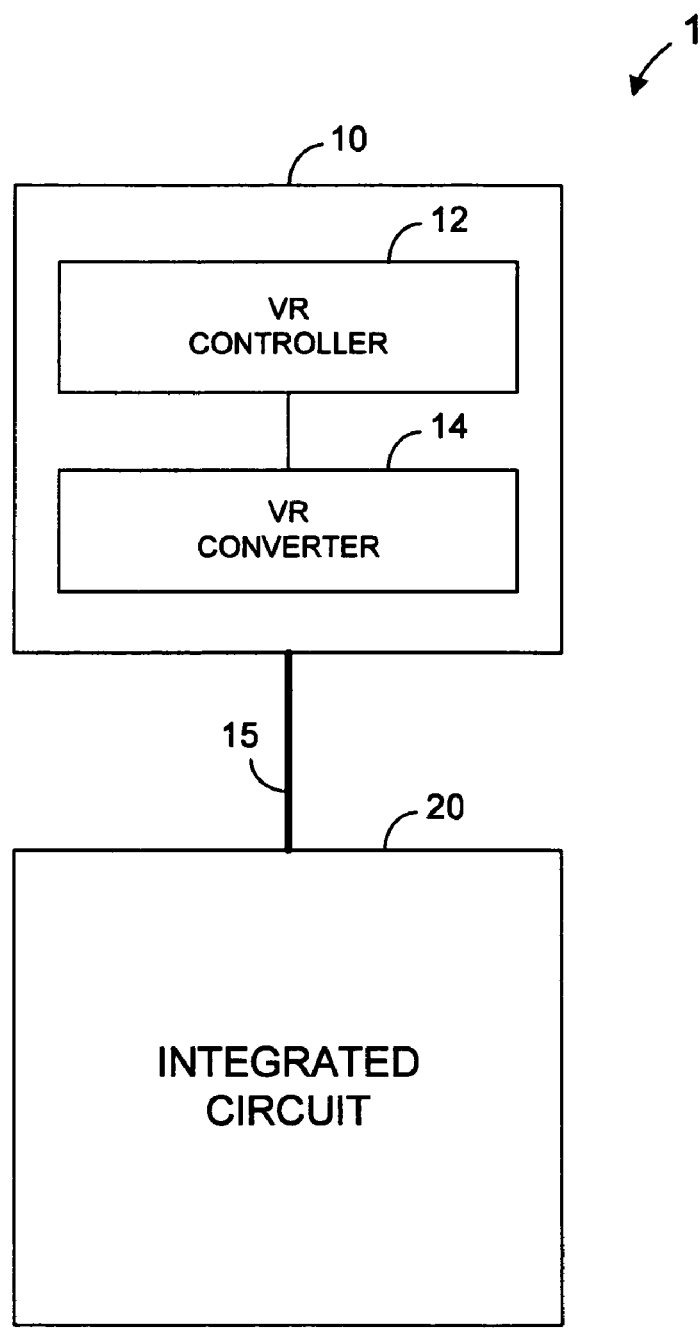
FIG. 1 is a block diagram of a system according to some embodiments.

FIG. 1 is a block diagram of system 1 according to some embodiments. System 1 comprises voltage regulator 10, which in turn comprises voltage regulator controller 12 and voltage regulator converter 14. Voltage regulator 10 outputs power at a supply voltage and a supply current to power bus 15, which in turn provides the power to IC 20. IC 20 may comprise a microprocessor or any suitable IC. System 1 may be used in a computer motherboard or in any other platform according to some embodiments. For example, voltage regulator 10 may be implemented as a voltage regulator "module" that is mounted to a substrate that in turn may be coupled to a motherboard, as a voltage regulator "down" having elements that are mounted directly on a motherboard, or in any other fashion.

Generally, voltage regulator 10 may comprise any currently- or hereafter-known device to provide power at a particular supply voltage and a particular supply current to IC 20. According to some embodiments, voltage regulator controller 12 transmits a control signal to voltage regulator converter 14. Voltage regulator converter 14 then adjusts the supply voltage, with the value of the supply voltage being controlled by the control signal. Voltage regulator converter 14 may comprise a single or multi-phase Buck regulator or any other suitable device. Further details of voltage regulator converter 14 according to some embodiments are provided below.

Figure 2:
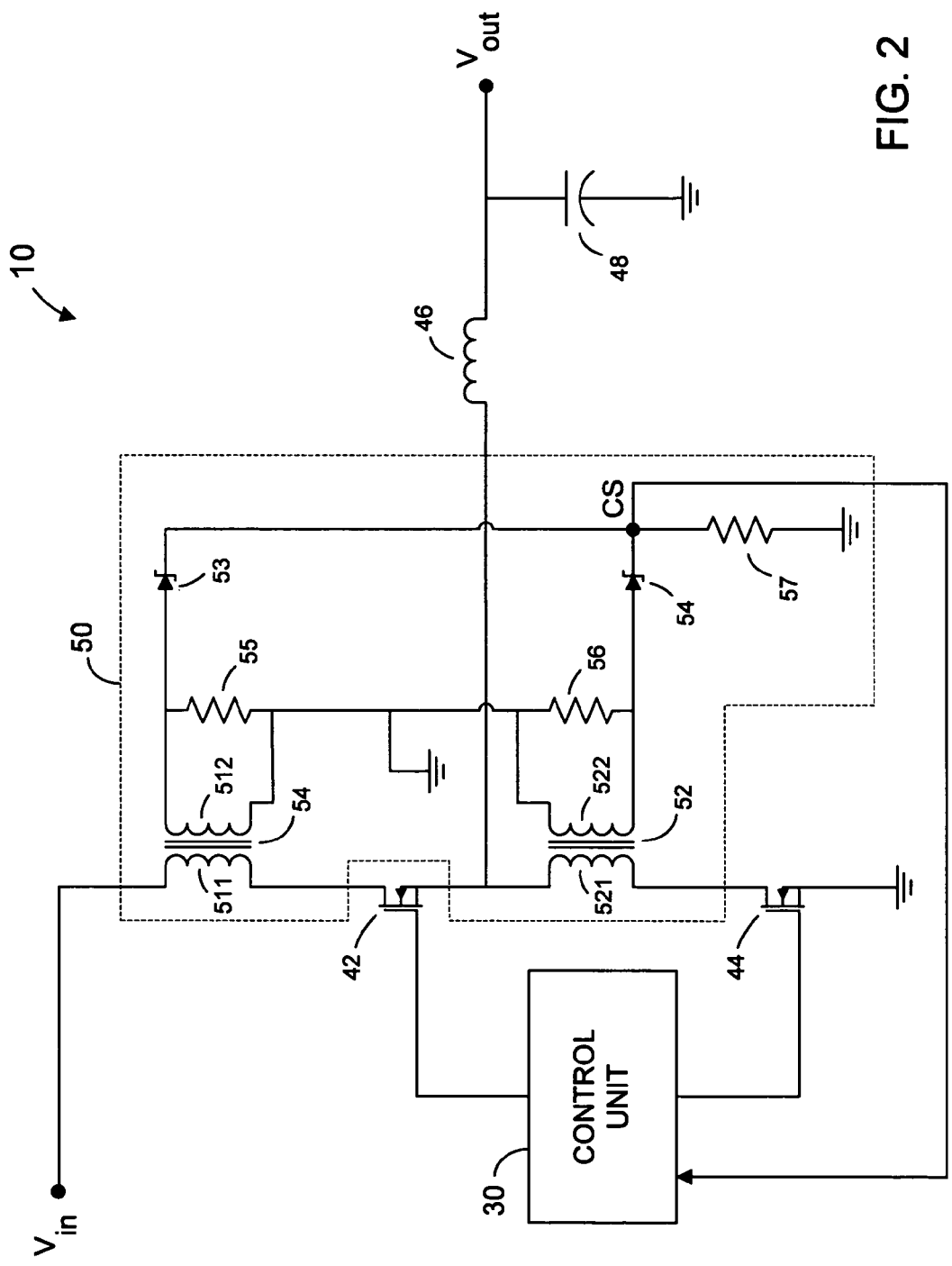
FIG. 2 is a schematic diagram of a voltage regulator according to some embodiments.

FIG. 2 is a schematic diagram of voltage regulator 10 according to some embodiments. Voltage regulator 10 of FIG. 2 comprises control unit 30, a voltage regulator converter composed of switch 42, switch 44, inductor 46 and capacitor 48, and current sensing circuit 50. Voltage regulator 10 receives a first power signal at node $V_{in}$ and generates a second power signal at node $V_{out}$.

Control unit 30 may comprise any suitable currently- or hereafter-known device to transmit a control signal for controlling a voltage regulator converter. According to some embodiments, control unit 30 comprises a voltage regulator controller IC that provides functionality in addition to that described herein.

Control unit 30 is coupled to switch 42 and switch 44. Control unit 30 may transmit control signals to transfer switch 42 and switch 44 between "open" and "closed" states. According to some embodiments, control unit 30 may control switch 42 and switch 44 to enter a first state in which switch 42 is closed and switch 44 is open, and to enter a second state in which switch 42 is open and switch 44 is closed. Such control may generate a power signal having a desired voltage at node $V_{out}$. Node $V_{out}$ may be coupled to a power input of an integrated circuit, including but not limited to a microprocessor.

Switches 42 and 44 of FIG. 2 comprise n-channel metal-oxide semiconductor field effect transistors (nMOSFETs). Control unit 30 is coupled to gate terminals of switches 42 and 44 and may therefore cause one of switches 42 and 44 to pass current by applying a suitable positive voltage to an associated gate terminal.

One end of inductor 46 is coupled to a source terminal of switch 42 and to a drain terminal of switch 44 and the other end of inductor 46 is coupled to node $V_{out}$. As mentioned above, inductor 46 is a voltage regulator component that is coupled to node $V_{in}$ via switch 42 in the first state described above and that is coupled to ground via switch 44 in the above-described second state. Capacitor 48 is coupled to inductor 46 at node $V_{out}$. Switch 42, switch 44, inductor 46 and capacitor 48 comprise a voltage regulator converter to convert a voltage provided at node $V_{in}$ to a desired voltage at node $V_{out}$ based on control signals received from control unit 30. According to some voltage regulator terminology, switch 42 may be referred to as a "high side" switch and switch 44 may be referred to as a "low side" switch. Other types and/or configurations of a voltage regulator may be used in conjunction with some embodiments.

Current sensing circuit 50 comprises transformer 51 and transformer 52. Transformer 51 includes primary windings 511 and secondary windings 512. Primary windings 511 are coupled in series to a drain terminal of switch 42 and to node $V_{in}$. Primary windings 511 may comprise a single-turn winding implemented as a trace passing through a core window. According to some embodiments, switch 42 is disposed between node $V_{in}$, and primary windings 511. In either case, it may be considered that switch 42 is coupled to node $V_{in}$.

Transformer 52 includes primary windings 521 and secondary windings 522. Primary windings 521 may also comprise a single-turn winding implemented as a trace passing through a core window. Primary windings 521 are coupled in series to a drain terminal of switch 44 and to ground. In some embodiments, primary windings 521 are disposed between switch 44 and ground. Again, either of the above cases represents a coupling between switch 42 and ground.

Secondary windings 512 are coupled to a cathode of diode 53 and to ground, and secondary windings 522 are coupled to a cathode of diode 54 and to ground. According to some embodiments, a turns ratio of secondary windings 512 to primary windings 511 is N, and a turns ratio of secondary windings 522 to primary windings 521 is also N. Secondary windings 512 may be configured such that a "high side" current flowing through switch 42 and through primary windings 511 generates a current through secondary windings 512 that causes diode 53 to become forward-biased. Similarly, secondary windings 522 may be configured such that a "low side" current flowing through switch 44 and through primary windings 521 generates a current through secondary windings 522 that forward-biases diode 54.

Resistors 55 and 56 are coupled in parallel to secondary windings 512 and 522, respectively. Resistors 55 and 56 may absorb energy stored in respective primary windings 511 and 521. Resistor 55 and/or resistor 56 may be omitted in some embodiments where parasitic capacitances of transformers 51 and 52 are sufficient to absorb such energies.

Anodes of diodes 53 and 54 are coupled to resistive element 57, which is in turn coupled to ground. Resistive element 57 may comprise a current-sensing resistor. Current-sensing node CS may be coupled to control unit 30 in order to allow control unit 30 to determine a voltage and current present at node CS. Control unit 30 may then determine an output voltage and output current that is present at node $V_{out}$ based on the voltage and current present at node CS. In this regard, a current received by element 57 during operation of voltage regulator 10 may be substantially proportional to a current received by inductor 46. In some embodiments, the current received by element 57 is substantially equal to the current received by inductor 46 divided by the above-mentioned turns ratio N.

Figure 3:
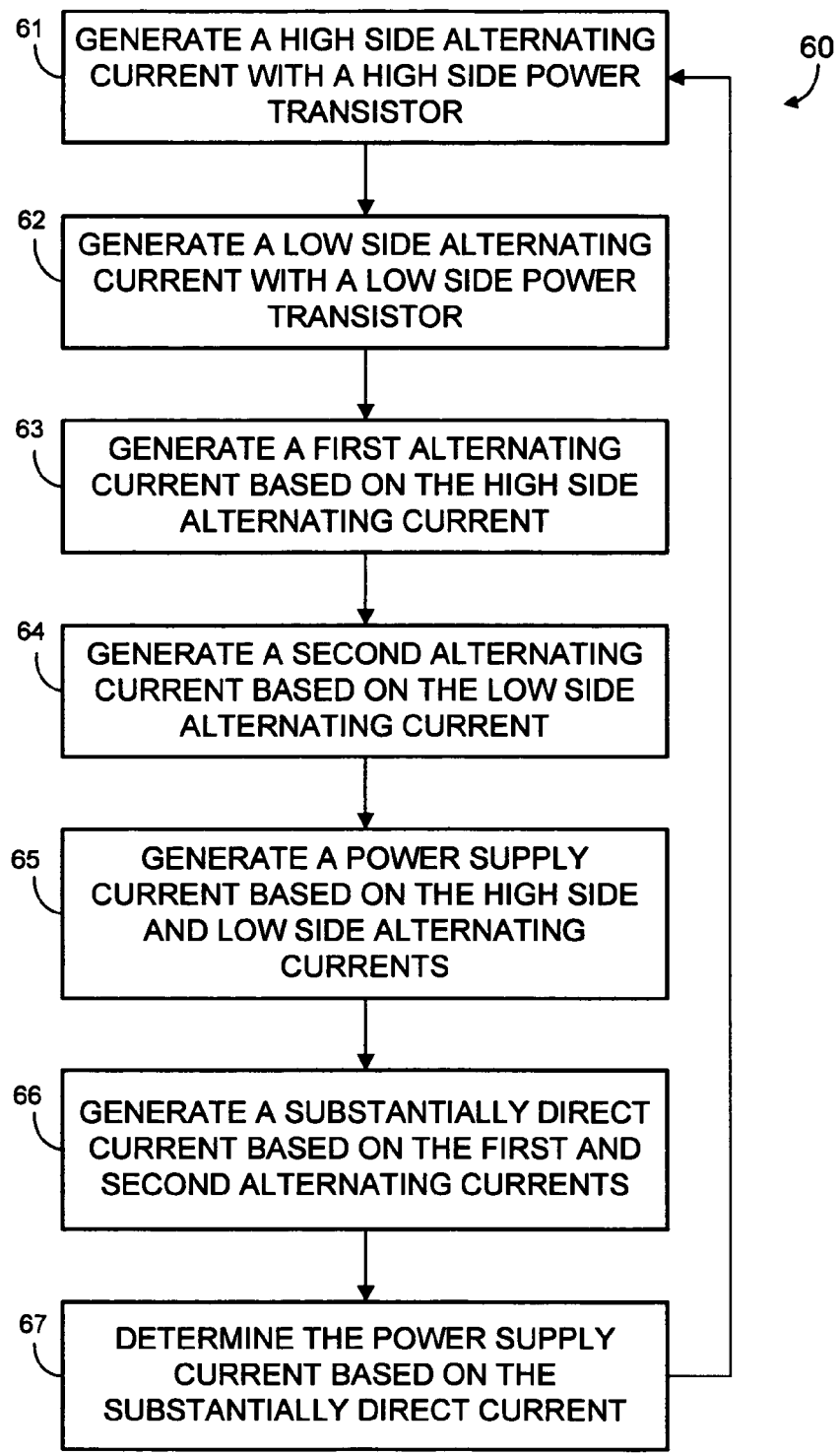
FIG. 3 is diagram of a process according to some embodiments.

FIG. 3 is a flow diagram of process 60. Process 60 illustrates procedures executed by voltage regulator 10 according to some embodiments. However, process 60 may be executed by any combination of discrete components, integrated circuits, and/or software.

Initially, at 61, a high side alternating current is generated using high side power transistor. A low side alternating current is generated at 62 using a low side power transistor.

Voltage regulator 10 of FIG. 2 may execute 61 and 62 simultaneously by operating control unit 30 to continuously transfer switches 42 and 44 between the first state and the second state described above. Such opening and closing of switches 42 and 44 generates a high side alternating current within primary windings 511 and a low side alternating current within primary windings 521. Control unit 30 may control the opening and closing of switches 42 and 44 during 61 and 62 in order to generate a desired output voltage at node $V_{out}$ based on the input voltage at node $V_{in}$. According to some embodiments, the input voltage fluctuates around 12VDC and the desired output voltage is 1VDC.

A first alternating current is generated based on the high side alternating current at 63 and a second alternating current is generated based on the low side alternating current at 64. In some embodiments of 63, transformer 51 generates the first alternating current within secondary windings 512 based on the high side alternating current flowing in primary windings 511. At 64, transformer 52 may generate the second alternating current within secondary windings 522 based on the low side alternating current flowing in primary windings 521.

A power supply current is generated at 65 based on the high side and low side alternating currents. With reference again to the example of FIG. 2, the high side and low side alternating currents may flow directly from drain terminals of switches 42 and 44 and combine to form a power supply current that is received by inductor 46. Control unit 30 may control the opening and closing of switches 42 and 44 at 61 and 62 so that a desired power supply current is generated at 65.

At 66, a substantially direct current is generated based on the first and the second alternating currents. The substantially direct current may be substantially equal to the power supply current divided by the turns ratio of transformers 51 and 52. A rectifier circuit may generate the substantially direct current according to some embodiments of 66. Voltage regulator 10 of FIG. 2 includes a rectifier circuit composed of diode 53 and diode 54. Diode 53 and diode 54 may receive the first alternating current and the second alternating current, respectively, and generate the substantially direct current at node CS. More specifically, unipolar currents flowing in turn through diodes 53 and 54 form a DC voltage across element 57 that may be substantially proportional to a current flowing through inductor 46. According to some embodiments, this arrangement provides delay-free, inertia-less inductor current monitoring.

In this regard, control unit 30 may determine the power supply current based on the substantially direct current at 67. According to some examples of 67, control unit 30 detects a voltage at node CS and calculates the substantially direct current by dividing the detected voltage by the impedance of resistive element 57. Control unit 30 then calculates the power supply current by multiplying the calculated substantially direct current by the turns ratio of transformers 51 and 52. Since the current flowing through sensing resistive element 57 is a fraction of the power supply current, the impedance of resistive element 57 can be set higher than in conventional current sensing systems, which may provide better accuracy in monitoring the power supply current. Process 60 then returns to 61 and 62 to control switch 42 and switch 44 based on the calculated power supply current.

Voltage regulator 10 therefore comprises a feedback loop detects its own output and allows future output to be controlled based on the detected output. The elements of process 60 may be performed continuously and simultaneously during power delivery from voltage regulator 10 to an external circuit and/or device.

Some embodiments may reduce a percentage of produced power that is consumed by the current-sensing functions of a voltage regulator. For example, power dissipated by current-sensing circuit 50 is equal to $(V_D+V_W+V_S)*I_L/N$, where $V_D$ is the voltage drop of diodes 53 and 54, $V_W$ is the voltage drop of secondary windings 512 and 522, $V_S$ is the voltage drop across element 57, $I_L$ is the power supply current through inductor 46, and N is the above-described turns ratio. Assuming $V_D$=0.3V, $V_W$=0.1V, $V_S$=0.05V, $I_L$=100 A, and N=100, the dissipated power is 0.45 W. In comparison, some conventional current-sensing systems with similar current-monitoring accuracy consume up to 10 W.

As described above, diodes 53 and 54 conduct current during "closed" states of respective switches 42 and 44. Accordingly, magnetic flux generated by the primary windings of transformers 51 and 52 may compensate for magnetic flux generated by the secondary windings of transformers 51 and 52. This phenomena may cause the power supply current to be independent of DC magnetizing forces generated by transformers 51 and 52. As a result, transformers 51 and 52 may comprise relatively small cores sufficient to accommodate small gauge secondary windings.

Figure 4:
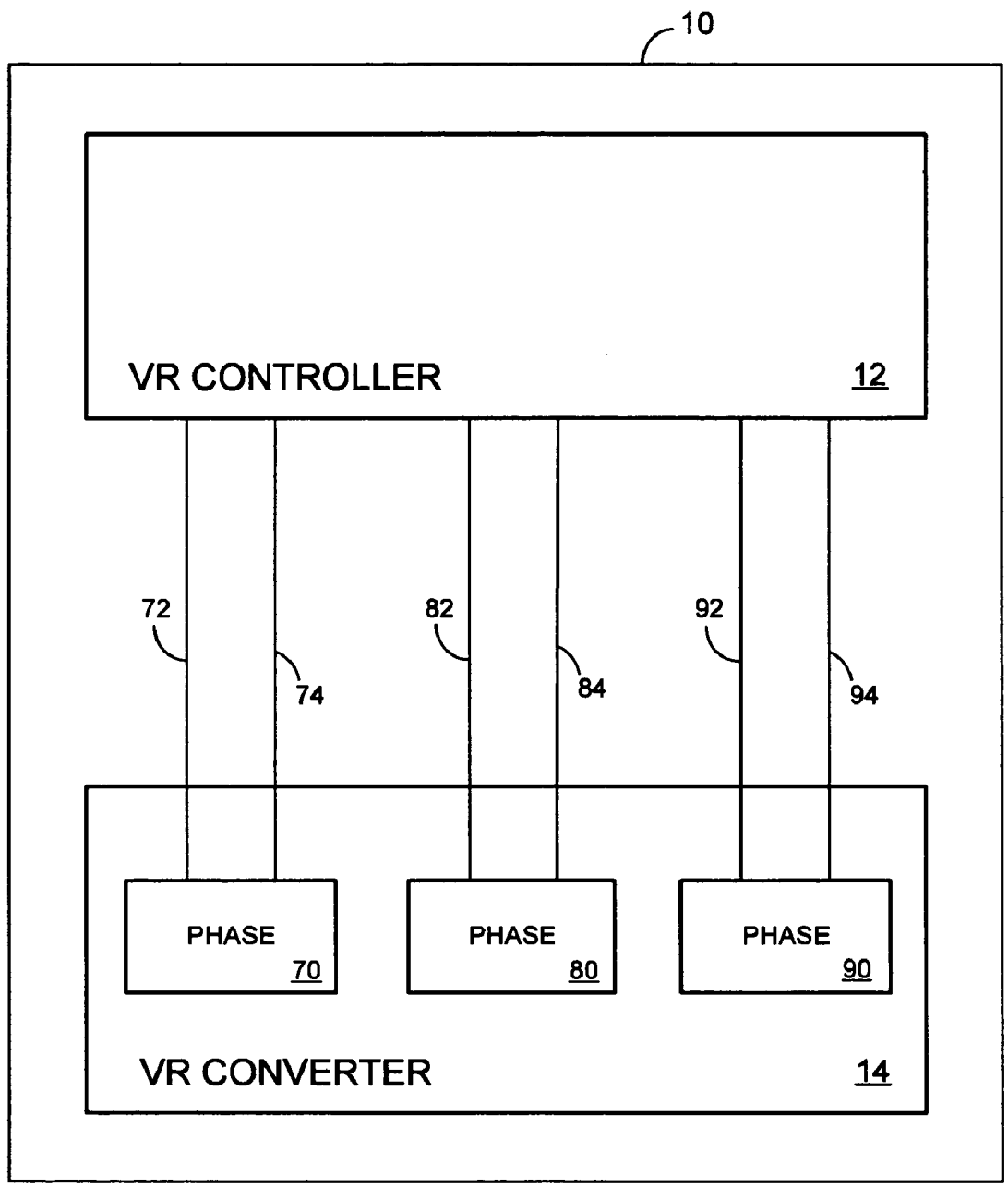
FIG. 4 is a block diagram of a voltage regulator according to some embodiments.

FIG. 4 is a block diagram of voltage regulator 10 according to some embodiments. Voltage regulator converter 14 of FIG. 4 includes three phases: phase 70; phase 80; and phase 90. In some embodiments, each of phases 70 through 90 includes each element (except for control unit 30) shown in FIG. 2. Therefore, each of phases 70 through 90 includes a dedicated current sensing circuit such as circuit 50.

Voltage regulator controller 12 controls phases 70 through 90 via respective ones of control buses 72, 82 and 92. Each of control buses 72, 82 and 92 may comprise one or more lines, depending upon the system used to control an associated phase. For example, two lines are used to control the phase illustrated in FIG. 2. Each of phases 70 through 90 provides feedback to voltage regulator controller 12 via a respective one of lines 74, 84 and 94. These feedback lines may be coupled to current-sensing nodes such as node CS that reside within current-sensing circuits of phases 70 through 90.

Figure 5:
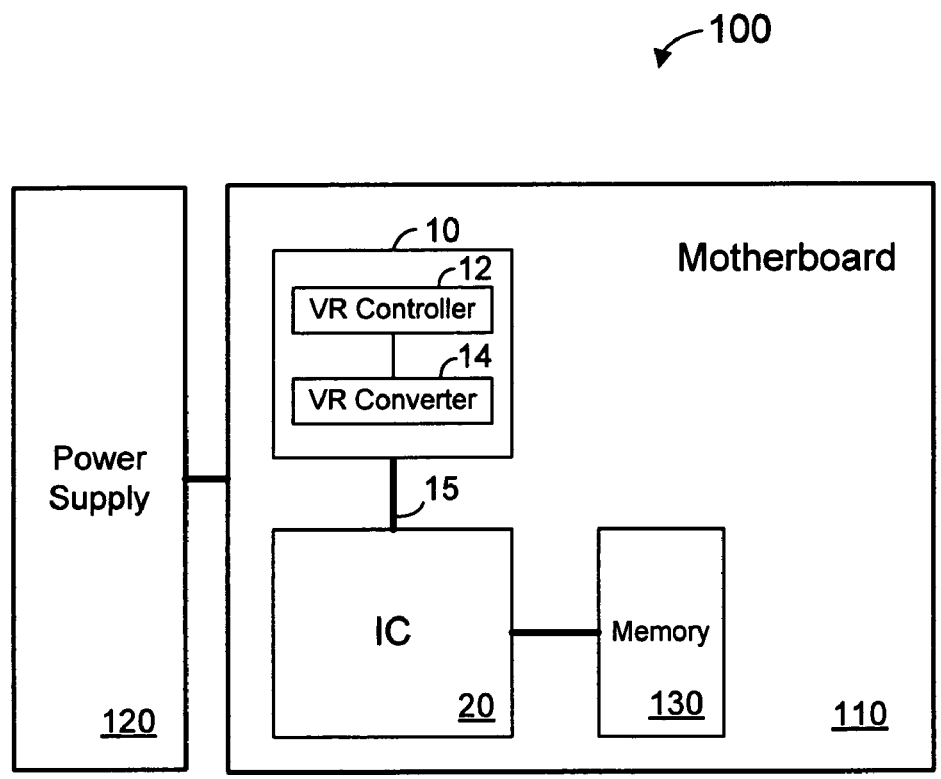
FIG. 5 is a block diagram of a system according to some embodiments.

FIG. 5 illustrates a system to execute process 60 according to some embodiments. System 100 includes voltage regulator 10, IC 20, motherboard 110, power supply 120, and memory 130. System 100 may comprise components of a desktop computing platform, and memory 130 may comprise any type of memory for storing data, such as a Single Data Rate Random Access Memory, a Double Data Rate Random Access Memory, or a Programmable Read Only Memory.

Voltage regulator 10 may receive DC power from power supply 120 and regulate the DC power based on power requirements of IC 20. Motherboard 110 may therefore include signal lines of power bus 15. Similarly, motherboard 110 may route I/O signals between IC 20 and memory 130.

The several embodiments described herein are solely for the purpose of illustration. Some embodiments may include any currently or hereafter-known versions of the elements described herein. Therefore, persons skilled in the art will recognize from this description that other embodiments may be practiced with various modifications and alterations.

What is claimed is:

1. An apparatus comprising:
   a first switch;
   a first transformer comprising first primary winding and first secondary winding, the first primary winding coupled in series to the first switch;
   a second switch;
   a second transformer comprising second primary winding and second secondary winding, the second primary winding coupled in series to the second switch;
   a control unit coupled to the first switch and to the second switch, the control unit to control the first switch and the second switch to enter a first state in which the first switch is closed and the second switch is open, and to enter a second state in which the first switch is open and the second switch is closed;
   a first load coupled to an input node via the first switch in the first state and coupled to ground via the second switch in the second state, the first load to receive a first current;
   a circuit coupled to the first secondary winding and to the second secondary winding; and
   a second load coupled to the circuit, the second load to receive a second current substantially proportional to the first current.

2. An apparatus according to claim 1, wherein a turns ratio of the first transformer is N, wherein a turns ratio of the second transformer is N, and wherein the second current is to be substantially equal to the first current divided by N.

3. An apparatus according to claim 1, the circuit comprising:
   a first diode, an anode of the first diode coupled to a first terminal of the first secondary winding; and
   a second diode, an anode of the second diode coupled to a first terminal of the second secondary winding,
   wherein a cathode of the first diode and a cathode of the second diode are coupled to the second load.

4. An apparatus according to claim 3, the circuit further comprising:
   a first resistive element coupled to the first terminal of the first secondary winding and to a second terminal of the first secondary winding; and
   a second resistive element coupled to the first terminal of the second secondary winding and to a second terminal of the second secondary winding.

5. An apparatus according to claim 1, wherein the control unit is coupled to the second load, and wherein the control unit controls the first switch and the second switch based at least in part on the second current.

6. An apparatus according to claim 5, wherein the first load is coupled to a voltage input of an integrated circuit.

7. An apparatus comprising:
   a voltage regulator converter to generate a supply voltage, the voltage regulator converter comprising a high side power transistor to generate a high side alternating current and a low side power transistor to generate a low side alternating current;
   a current sensing circuit to generate a first alternating current based on the high side alternating current and to generate a second alternating current based on the low side alternating current;
   a rectifier circuit to generate a substantially direct current based on the first alternating current and on the second alternating current; and
   a resistive element to receive the substantially direct current, wherein a voltage drop across the resistive element is to be proportional to the supply voltage.

8. An apparatus according to claim 7, wherein the current sensing circuit comprises:
   a first transformer to receive the high side alternating current and to generate the first alternating current based on the high side alternating current; and
   a second transformer to receive the low side alternating current and to generate the second alternating current based on the low side alternating current.

9. An apparatus according to claim 8, wherein the first transformer comprises:
   first primary winding to receive the high side alternating current and first secondary winding to carry the first alternating current,
   wherein the second transformer comprises:
   second primary winding to receive the low side alternating current and second secondary winding to carry the second alternating current,
   wherein a turns ratio of the first secondary winding to the first primary windings and a turns ratio of the second secondary winding to the second primary winding are equal to N, and
   wherein the voltage drop is to be substantially equal to the supply voltage divided by N.

10. An apparatus according to claim 9, wherein the rectifier circuit comprises:
    a first diode to receive the first alternating current from the first secondary winding; and a second diode to receive the second alternating current from the second secondary winding, wherein a cathode of the first diode and a cathode of the second diode are coupled to the resistive element.

11. An apparatus according to claim 9, wherein the current sensing circuit further comprises:

a first resistive element coupled to a first terminal of the first secondary winding and to a second terminal of the first secondary winding; and a second resistive element coupled to a first terminal of the second secondary winding and to a second terminal of the second secondary winding.

12. An apparatus according to claim 7, wherein the rectifier circuit comprises:

a first diode to receive the first alternating current; and a second diode to receive the second alternating current, wherein a cathode of the first diode and a cathode of the second diode are coupled to the resistive element.

13. An apparatus according to claim 7, further comprising:

a voltage regulator controller coupled to the resistive element, the voltage regulator controller to control the high side power transistor to generate the high side alternating current and to control the low side power transistor to generate the low side alternating current based at least in part on the voltage drop.

14. A method comprising:

generating a high side alternating current with a high side power transistor;

generating a low side alternating current with a low side power transistor;

generating a first alternating current based on the high side alternating current using a first transformer having a turns ratio of N;

generating a second alternating current based on the low side alternating current using a second transformer having a turns ratio of N;

generating a power supply current based on the high side alternating current and on the low side alternating current; and generating a substantially direct current based on the first alternating current and on the second alternating current, wherein the substantially direct current is substantially equal to the power supply current divided by N.

15. A method according to claim 14, further comprising:

controlling the high side power transistor to generate the high side alternating current and controlling the low side power transistor to generate the low side alternating current based at least in part on the substantially direct current.

16. A system comprising:

a microprocessor;

a double data rate memory coupled to the microprocessor; and a voltage regulator to provide a supply voltage to the microprocessor, the voltage regulator comprising:

a voltage regulator converter to generate the supply voltage, the voltage regulator converter comprising a high side power transistor to generate a high side alternating current and a low side power transistor to generate a low side alternating current;

a current sensing circuit to generate a first alternating current based on the high side alternating current and to generate a second alternating current based on the low side alternating current;

a rectifier circuit to generate a substantially direct current based on the first alternating current and on the second alternating current; and a resistive element to receive the substantially direct current, wherein a voltage drop across the resistive element is to be proportional to the supply voltage.

17. A system according to claim 16, wherein the current sensing circuit comprises:

a first transformer to receive the high side alternating current and to generate the first alternating current based on the high side alternating current; and a second transformer to receive the low side alternating current and to generate the second alternating current based on the low side alternating current.

18. A system according to claim 17, wherein the first transformer comprises:

first primary winding to receive the high side alternating current and first secondary winding to carry the first alternating current, wherein the second transformer comprises:

second primary winding to receive the low side alternating current and second secondary winding to carry the second alternating current, wherein a turns ratio of the first secondary winding to the first primary windings and a turns ratio of the second secondary winding to the second primary winding are equal to N, and wherein the voltage drop is to be substantially equal to the supply voltage divided by N.

19. A system according to claim 18, wherein the rectifier circuit comprises:

a first diode to receive the first alternating current from the first secondary winding; and a second diode to receive the second alternating current from the second secondary winding, wherein a cathode of the first diode and a cathode of the second diode are coupled to the resistive element.

20. A system according to claim 16, the voltage regulator further comprising:

a voltage regulator controller coupled to the resistive element, the voltage regulator controller to control the high side power transistor to generate the high side alternating current and to control the low side power transistor to generate the low side alternating current based at least in part on the voltage drop.

* * * * *